P. VITALI.
Improvement in Track-Laying Apparatus.
No. 131,581. Patented Sep. 24, 1872.
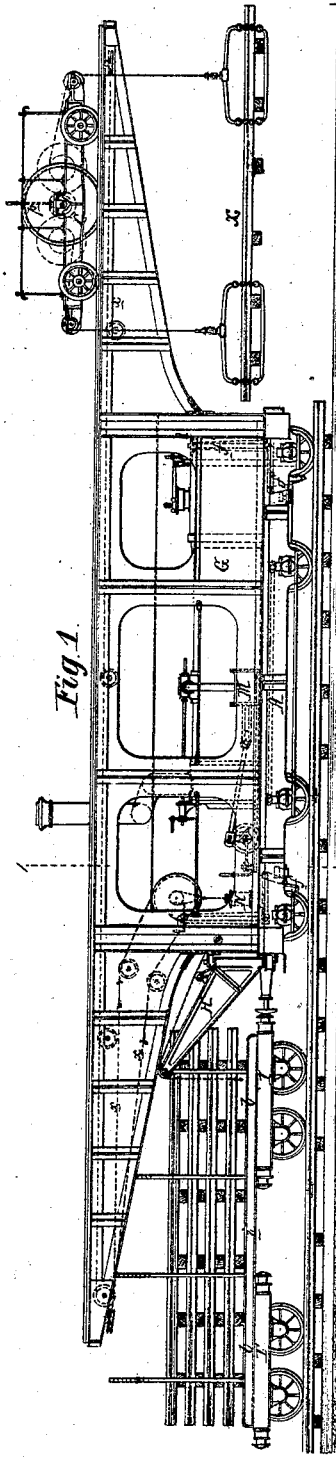
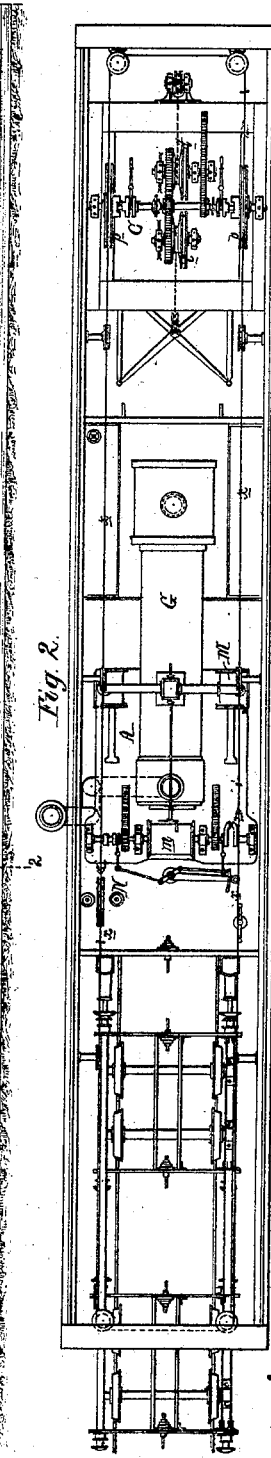
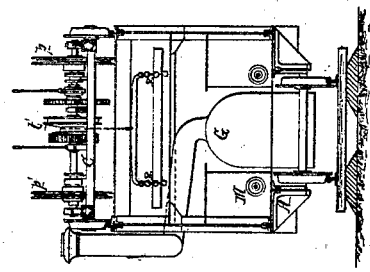
Philippe Vitali
by his Attr.
Witnesses.

UNITED STATES PATENT OFFICE.

PHILIPPE VITALI, OF PARIS, FRANCE.

IMPROVEMENT IN TRACK-LAYING APPARATUS.

Specification forming part of Letters Patent No. 131,581, dated September 24, 1872.

*To all whom it may concern:*

Be it known that I, PHILIPPE VITALI, engineer, of Paris, France, have invented a System and Apparatus for Accelerating the Laying of Permanent Ways, of which the following is a specification:

The object of my invention is to lay the sleepers and rails of railways without repeated transfers, and with as little manual labor as possible, to effect which the track is made in sections, (by bolting parallel rails to sleepers,) and these sections are placed upon a car provided with appliances, (or else preceded by a carriage provided with appliances,) whereby the said sections may be raised successively from the car, carried forward, and lowered to a position in a line with the section previously laid, the track, as it is thus prolonged, serving as a way on which the laying apparatus travels.

The accompanying drawing represents apparatus that may be employed for removing the sections from the car and laying them successively in a line with the track, although various apparatus may be contrived for the purpose.

The sections of the track (each consisting of parallel rails bolted to the cross-ties or sleepers arranged at proper distances) are of any suitable length, and are piled between uprights upon a car, Fig. 4, which is preceded by a carriage, G, both carriage and car having flanged wheels for traversing the track as it is laid. The side frames A of the carriage extend at both ends considerably beyond the ends of the carriage-truck, and support elevated rails on which runs a truck, C, the latter being provided with drums and chains or other hoisting apparatus, whereby the uppermost section on the car may be seized, elevated, and (after the truck is drawn forward to the front of the carriage) lowered to a position on the ground in a line with the track already laid.

The car and carriage may be propelled by a locomotive in the rear, but I prefer to arrange on the carriage a propelling-engine, M, and auxiliary engine N for imparting the traversing motion to the truck C through the medium of endless ropes $x$ passing round a drum driven by said engine.

When a car is unloaded its trucks I I' may be detached from each other and successively removed laterally from the track to permit a loaded car to be moved up to its place at the rear of the carriage. This removal of the trucks is best effected by the aid of a crane, H, arranged at the rear of the carriage and operated by the engine N.

Claims.

1. The mode herein described of laying railways—that is to say, connecting parallel rails to sleepers, forming sections, carrying said sections upon a car or truck to the end of the track, and depositing and securing said sections successively in a line with the track already laid.

2. The combination, with a car or truck carrying said sections, of the apparatus described, or any equivalent apparatus, whereby the sections may be successively removed, carried beyond the front of the car, and deposited in a line with the sections or track already laid.

3. The carriage described, its elevated track projecting beyond each end of the carriage-truck, and truck C traversing said track, and provided with hoisting mechanism, arranged to operate as described.

In testimony whereof I have signed my name to this specification in the presence of two subscribing witnesses.

PHILIPPE VITALI.

Witnesses:
EMILE RICHARD,
AUGUSTE CHÉNOT.